(12) United States Patent
Abe et al.

(10) Patent No.: US 7,190,517 B2
(45) Date of Patent: Mar. 13, 2007

(54) LIGHT DIFFUSING SUBSTRATE, TRANSMISSION SCREEN, AND DISPLAY DEVICE

(75) Inventors: Takashi Abe, Tokyo (JP); Tsutomu Yoshida, Tokyo (JP); Kikuko Matsumura, Tokyo (JP); Yoshiaki Shiina, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 0 days.

(21) Appl. No.: 11/254,785

(22) Filed: Oct. 21, 2005

(65) Prior Publication Data
US 2006/0039066 A1 Feb. 23, 2006

Related U.S. Application Data

(62) Division of application No. 10/645,880, filed on Aug. 22, 2003, now Pat. No. 6,984,046.

(30) Foreign Application Priority Data

Aug. 30, 2002 (JP) ............................ P2002-254121

(51) Int. Cl.
*G03B 21/60* (2006.01)
*G03B 21/56* (2006.01)
*G02B 5/02* (2006.01)
*G02B 13/20* (2006.01)

(52) U.S. Cl. ...................... 359/457; 353/459; 353/460; 353/599

(58) Field of Classification Search ................ 359/453, 359/457, 459, 460, 599
See application file for complete search history.

(56) References Cited

U.S. PATENT DOCUMENTS

| 5,066,099 A | * | 11/1991 | Yoshida et al. ............. 359/457 |
|---|---|---|---|
| 5,457,572 A | | 10/1995 | Ishii et al. ................... 359/457 |
| 5,485,308 A | | 1/1996 | Hirata et al. ................ 359/457 |
| 5,683,501 A | * | 11/1997 | Tomihisa et al. ........... 106/491 |
| 6,217,176 B1 | * | 4/2001 | Maekawa ................... 359/601 |
| 6,275,334 B1 | | 8/2001 | Park ........................... 359/457 |
| 6,602,596 B2 | * | 8/2003 | Kimura et al. .............. 428/327 |
| 6,624,934 B1 | | 9/2003 | Moshrefzadeh et al. .... 359/457 |

(Continued)

FOREIGN PATENT DOCUMENTS

JP 9-120101 5/1997

(Continued)

OTHER PUBLICATIONS

Merriam-Webster's Collegiate Dictionary, Tenth Edition, copyright 2001, p. 651, definition of "laminate".

*Primary Examiner*—Melissa Jan Koval

(57) ABSTRACT

A transmission screen includes a Fresnel lens sheet through which light is projected from a projector to a lenticular lens sheet arranged on a viewer side, as approximately parallel light, and the lenticular lens sheet receiving light passing through the Fresnel lens sheet, and emitting the approximately parallel light while horizontally widening, by means of a group of cylindrical lenses which are horizontally in parallel, wherein in at least one of the Fresnel lens sheet and the lenticular lens sheet, on a surface of a light diffusing substrate, in which a light diffusing material is dispersed, irregularities which constitute a lens section is formed, and in the light diffusing substrate, dispersion density of the light diffusing material differs in at least two layers in the thickness direction.

5 Claims, 12 Drawing Sheets

U.S. PATENT DOCUMENTS 6,709,143 B2 *  3/2004  Harada et al. ............... 362/558
2004/0105052 A1 *  6/2004  Uekita et al. ............... 349/112

FOREIGN PATENT DOCUMENTS

| JP | 10-083029 | 3/1998 |
| JP | 11-27510 | 10/1999 |
| JP | 2003-050307 | 2/2003 |
| JP | 2003-057416 | 2/2003 |

* cited by examiner

FIG. 7

| | LIGHT DIFFUSING LAYER 1 | LIGHT DIFFUSING LAYER 2 | →VIEWER SIDE | HORIZONTAL VIEWING ANGLE (deg) | | | | SHARPNESS | APPEARANCE OF VIEWING SURFACE | | COLOR CHANGE | |
|---|---|---|---|---|---|---|---|---|---|---|---|---|
| | | | | αH (1/2) | βH (1/3) | γH (1/10) | δH (1/20) | | EXTERNAL LIGHT REFLECTANCE (%) | | ΔX | ΔY |
| EXAMPLE 1 | ORGANIC 30% THICKNESS 0.02 mm | ORGANIC 15% THICKNESS 0.02 mm | | 35 | 42 | 53 | 58 | EXCELLENT | 3.5 | GOOD | 0.01 | 0.01 |
| EXAMPLE 2 | ORGANIC 15% THICKNESS 0.02 mm | ORGANIC 30% THICKNESS 0.02 mm | | 35 | 42 | 53 | 58 | EXCELLENT | 4.2 | FAIR | 0.01 | 0.01 |
| EXAMPLE 3 | ORGANIC 15% THICKNESS 0.02 mm | ORGANIC 15% THICKNESS 0.02 mm | | 35 | 42 | 52 | 56 | EXCELLENT | 3.2 | GOOD | 0.01 | 0.01 |
| EXAMPLE 4 | INORGANIC 30% THICKNESS 0.02 mm | ORGANIC 15% THICKNESS 0.02 mm | | 35 | 42 | 55 | 62 | EXCELLENT | 3 | EXCELLENT | 0.005 | 0.005 |
| EXAMPLE 5 | ORGANIC 30% THICKNESS 0.02 mm | INORGANIC 15% THICKNESS 0.02 mm | | 35 | 42 | 55 | 60 | EXCELLENT | 3.4 | GOOD | 0.005 | 0.01 |
| COMPARATIVE EXAMPLE 1 | NO LIGHT DIFFUSION LAYER THICKNESS 2.0 mm | | | 35 | 41 | 51 | 55 | EXCELLENT | 4.5 | FAIR | 0.02 | 0.02 |
| COMPARATIVE EXAMPLE 2 | KNEADING OF ORGANIC DIFFUSING MATERIAL THICKNESS 2.0 mm | | | 35 | 42 | 53 | 58 | FAIR | 4 | FAIR | 0.02 | 0.02 |

LIGHT DIFFUSING SUBSTRATE, TRANSMISSION SCREEN, AND DISPLAY DEVICE

CROSS REFERENCE TO RELATED APPLICATION

This application is a Divisional of application Ser. No. 10/645,880 filed Aug. 22, 2003, now U.S. Pat. No. 6,984,046, and incorporated by reference herein.

BACKGROUND OF THE INVENTION

1. Field of the Invention

The present invention relates to a display device such as rear-projection screen television, a transmission screen used for the display device, and a light diffusing substrate constituting the screen.

2. Description of Related Art

As one conventional transmission screen, there is known for example as shown in FIG. 2, a transmission screen which is generally used for a rear-projection screen television equipped with a CRT projector.

The screen normally includes in sequence from the viewer side, at least two lens sheet members, namely a dual-surface lenticular lens sheet 20 and a Fresnel lens sheet 10. In some cases, a flat protection sheet 30 is arranged at an outermost position on the viewer side.

The dual-surface lenticular lens sheet 20 is a lenticular lens sheet configured by forming on both sides, lens sections 22 and 23 of multiple oblong cylindrical lenses with the vertical direction as the longitudinal direction continuously arrayed in a horizontal direction. The lens section 22 on the projector side has a function for refracting and diffusing in the vertical direction image light projected from the projector, and the other lens section 23 on the viewer side has a function for modifying color shift (a problem of color shift of outgoing light attributable to a three-tube projector being arranged off-axis) by synergism with the lens section on the projector side.

On the other hand, for the image light to be seen by the viewer it is necessary to expand the viewing area not only in the horizontal direction but also in the vertical direction. In the vertical direction, the viewing area is expanded not by the refracting and diffusing function of the lens but by the diffusing function of a light diffusing material, and a method for applying the light diffusing material 24 to the lenticular lens sheet is employed.

In application of the light diffusing material, techniques have been appropriately employed such as, mixing the light diffusing material into the lenticular lens sheet itself to diffuse the light diffusing material into the interior of the lens sheet, or spread forming on the lenticular lens sheet, as a different member to the lens sheet, an ink containing the light diffusing material, or laminating on the lenticular lens sheet a resin sheet which has been extrusion formed with the light diffusing material mixed therein.

Furthermore, a typical configuration is where convex parts are provided at the boundaries of the cylindrical lenses on the viewing surface side of the dual-surface lenticular lens sheet, and a shading layer 25 is formed by printing or transfer forming a black ink onto the flat portion of the apexes thereof.

The main purpose for forming the shading layer 25 is to improve the contrast of the image seen, and to absorb external light so that reflection on the screen surface is not seen by the viewer.

In the dual-surface lenticular lens sheet 20, since there are irregularities on the exposed viewing surface side, dust and dirt are easily attached. Therefore, in some cases a protection sheet 30 is arranged for preventing the attachment of dust and dirt, and for protecting the shading layer.

Normally, on the surface of the protection sheet 31, it is general to provide a surface treatment layer 38 such as a hard coat for excoriation resistance, or an antistatic treated layer, or the like.

Recently, rather than the rear-projection screen television equipped with a CRT projector (hereunder called a CRT projection-type rear projection television), a rear-projection screen television equipped with a liquid crystal projector (hereunder called a liquid crystal projection-type rear projection television) having characteristics such as less power consumption, light weight, and thinness, has become popular.

Specifically, with upgrading of the image source such as to correspond to digital high definition, development of television of a format which uses the high definition liquid crystal panel is flourishing. Also in a liquid crystal projection-type rear projection television, a transmission screen that is bright with high resolution, that has a wide viewing angle in both the horizontal and vertical directions, that is superior in contrast, and that enables viewing of sharp images, has been sought.

In the case of the CRT projection-type rear projection television, as mentioned above, in order to correct for color shift caused by positional differences of the respective three tubes of RGB after image light is projected by means of the three tubes, the dual-surface lenticular lens sheet is used for the transmission screen. On the other hand, in the case of the liquid crystal projection-type rear projection television, the image light regulated by the liquid crystal panel is projected through a monocular lens, and so that color shift caused by positional differences does not occur, a single face lenticular lens sheet having a lens section on only one surface can be used for the transmission screen.

An example of the transmission screen used for the liquid crystal projection-type rear projection television is shown in FIG. 3.

The screen is configured by at least two members, namely a lenticular lens sheet 70 and a Fresnel lens sheet 60.

The lenticular lens sheet 70 is generally of a configuration where a lens section of multiple oblong cylindrical lenses with the vertical direction as the longitudinal direction continuously arrayed in a horizontal direction of the screen face, is formed on only one surface (single face lenticular lens sheet), and has a function for refracting and diffusing image light in the vertical direction.

On the flat surface on the opposite side to the lens section, which becomes the viewer side, a shading layer 75 is formed similarly to the case of the dual-surface lenticular lens sheet, to prevent reflection due to external light and improve the contrast of the image seen.

Furthermore, similarly to the case of the CRT projection-type rear projection television, it is necessary to widen the viewing area by the diffusing function of the light diffusing material, and a method for applying a light diffusing material to the lenticular lens sheet is employed.

The present applicant has proposed a lenticular lens sheet of a configuration where a light diffusing layer is formed on a shading layer of a single face lenticular lens sheet on Japanese Unexamined Patent Application, First Publication No. H09-120101.

As a light diffusing layer 80, techniques have been appropriately employed such as, spread forming ink containing the light diffusing material on the shading layer of the lenticular lens sheet, or laminating on the lenticular lens sheet a resin sheet (diffusing sheet) 84 which has been extrusion formed with the light diffusing material mixed therein.

In the latter, when the separately manufactured diffusing sheet 81 is adhered via an adhesion layer 87 to the lenticular lens sheet 70, it has the dual function of also imparting rigidity to the lenticular lens sheet.

The same figure gives a description related to the light diffusing layer 80 where a surface treatment layer 88 that effects a desired surface treatment (hard coat, antistatic, antireflection), is formed as necessary on the surface of the diffusing sheet 81.

In the light diffusing sheet 81 in which the light diffusing material is dispersingly mixed, the light diffusing material 84 is exposed from the surface, so the surface smoothness of the diffusing sheet is low.

Therefore, when the diffusing sheet 80 is laminated to the lenticular lens sheet 70, there are problems with handling such as, cohesiveness is not good, and selection of the adhesive 87 is limited.

As a patent application related to the light diffusing layer for the screen, Japanese Unexamined Patent Application, First Publication No. H11-271510 by the present applicant is well-known.

The above patent application is "a light diffusing sheet characterized in being formed by a three-layer configuration where front and back external layers are an optical transmittable resin, and an intermediate layer is an optical transmittable resin in which diffusive particles are dispersed." The problems to be solved in this application are, a problem that in the case where an optical transmittable resin (intermediate layer) in which diffusive particles are dispersed, is laminated via an adhesive to another screen member (such as a lenticular lens sheet), the light diffusion characteristics change from the initial characteristics due to the influence of the adhesive; or a problem of adhesiveness between the light diffusing sheet and the other screen member when a surface condition is formed where the diffusive particles protrude from the intermediate layer. Since there is uncertainty about durability, and environmental changes such as temperature and humidity, the intermediate layer is protected and the smoothness of the surface is maintained by the optical transmittable resin of the front and back external layers.

Incidentally, there has been a demand for a light diffusing layer which is appropriate for screens in order to deal with problems peculiar to liquid crystal projection-type rear projection televisions.

In the liquid crystal projector, since the diameter of the projection pupil of the projection lens is small, then compared to the CRT projector, the following phenomena are noticeable.

A "hot bar" phenomenon where the brightness of the central point of incident light from the projector becomes a local high (hotspot), and bright stripes are observed in the direction of the parallel arrangement of the cylindrical lenses.

A "scintillation" phenomenon which is unnecessary flicker seen in the projected image.

In order to avoid hot bar, it is necessary to raise the light diffusion, and it is necessary to raise the light diffusion in a direction (vertical direction) perpendicular to the direction of the parallel arrangement of the cylindrical lenses.

Therefore, a proposal to enlarge the thickness of the light diffusing layer has been made by the present applicant as disclosed in Japanese Unexamined Patent Application, First Publication No. H10-83029.

On the other hand, in order to achieve high-definition of the image quality, it is desirable that the light diffusing layer be as thin as possible without causing a drop in resolution, resulting in a configuration in conflict with avoiding hot bar.

The present invention takes into consideration the above problems with the object of providing at a comparatively low cost a transmission screen, as a screen for a projection-type rear projection television (specifically, which uses a high-definition liquid crystal panel), that is bright with high resolution, that has a wide viewing angle in both the horizontal and vertical directions, that is superior in contrast, that enables viewing of sharp images, and further that reduces color shift.

SUMMARY OF THE INVENTION

The first aspect of the present invention is a transmission screen having a Fresnel lens sheet through which light is projected from a projector to a lenticular lens sheet arranged on a viewer side, as approximately parallel light, and the lenticular lens sheet receiving light passing through the Fresnel lens sheet, and emitting the approximately parallel light while horizontally widening, by means of a group of cylindrical lenses which are horizontally in parallel, wherein in at least one of the Fresnel lens sheet and the lenticular lens sheet, on a surface of a light diffusing substrate, in which a light diffusing material is dispersed, irregularities which constitute a lens section is formed, and in the light diffusing substrate, dispersion density of the light diffusing material differs in at least two layers in the thickness direction.

The light diffusing substrate may be spread formed with ink containing the light diffusing material on at least one surface of a resin sheet extrusion formed with the light diffusing material mixed therein. Furthermore, the light diffusing substrate may have laminated on the surface of the resin sheet extrusion formed with the light diffusing material mixed therein, another resin sheet extrusion formed with a different density of the light diffusing material mixed therein.

Moreover, on one surface of a transparent resin substrate which does not contain the light diffusing material, may be laminated at least two layers of resin layers containing the light diffusing material.

Furthermore, the dispersion density of the light diffusing material is preferably higher on the side of the projector than on the viewer side.

Moreover, in a multilayer configuration of the at least two layers, preferably the light diffusing material dispersed on the projector side is mainly composed of an inorganic material, and the light diffusing material dispersed on the viewer side is mainly composed of an organic material. Furthermore, preferably the light diffusing material dispersed on the Fresnel lens sheet side is an organic material, and the light diffusing material dispersed on the lenticular lens sheet side is an inorganic material.

Moreover, the surface on the viewer side of the light diffusing substrate may be subjected to at least one surface treatment selected from hard coat treatment, antistatic treatment, and antireflection treatment. Furthermore the surface on the viewer side of the resin sheet extrusion formed with the light diffusing material mixed therein, may be subjected to at least one surface treatment selected from hard coat treatment, antistatic treatment, and antireflection treatment.

The second aspect of the present invention is a transmission screen having a Fresnel lens sheet through which light is projected from a projector to a lenticular lens sheet arranged on a viewer side, as approximately parallel light, and the lenticular lens sheet receiving light passing through the Fresnel lens sheet, and emitting the approximately parallel light while horizontally widening, by means of a group of cylindrical lenses which are horizontally in parallel, wherein in the Fresnel lens sheet on one surface of a light diffusing substrate, in which a light diffusing material is dispersed, irregularities which constitute a lens section including a reacted product of a radioactive-ray-curable-resin is formed, and on the other surface, irregularities which constitute a lens section which light is vertically widened and projected from the projector is formed, by means of a group of the cylindrical lenses which are vertically in parallel, and in the lenticular lens sheet, on one surface of a substrate on the Fresnel lens sheet side, the group of cylindrical lenses which are horizontally in parallel is formed by a reacted product of a radioactive-ray-curable-resin, and on the other surface, at a position corresponding to the boundaries of the cylindrical lenses, a stripe-shaped shading layer is formed, and a light diffusing substrate made by laminating at least two layers of resin layers containing the light diffusing material on one surface of a transparent resin substrate which does not contain the light diffusing material, is laminated so that the side which does not contain the light diffusing material faces to the shading layer side, and in the resin layer, a dispersion density of the light diffusing material differs in at least two layers in the thickness direction.

The third aspect of the present invention is a transmission screen having a Fresnel lens sheet through which light is projected from a projector to a lenticular lens sheet arranged on a viewer side, as approximately parallel light, and the lenticular lens sheet receiving light passing through the Fresnel lens sheet, and emitting the approximately parallel light while horizontally widening, by means of a group of cylindrical lenses which are horizontally in parallel, wherein the lenticular lens sheet is formed with irregularities which constitute a lens section on the surface of a light diffusing substrate having a light diffusing layer, the light diffusing substrate is mainly composed of an organic material, the light diffusing layer contains at least two kinds of light diffusing material which differ at least in any one of shape, mean particle diameter, and material, and at least one kind of light diffusing material of the light diffusing materials comprises an inorganic material.

In the case where the shapes of at least two kinds of light diffusing material contained in the light diffusing layer are globular, the light diffusing layer may contain a first light diffusing material with a mean particle diameter satisfying a range of 1 to 10 mm and a second light diffusing material with a mean particle diameter satisfying a range of 20 to 50 mm.

Furthermore, in the case where at least one kind of light diffusing material contained in the light diffusing layer includes an organic material, the mean particle diameter of the organic light diffusing material is preferably larger than the mean particle diameter of an inorganic diffusing agent where the light diffusing material comprises an inorganic material.

Moreover, the at least two kinds of light diffusing material which differ at least in any one of shape, mean particle diameter, and material, contained in the light diffusing layer, may further contain an inorganic light diffusing material of irregular shape.

According to the above aspects, by combining a Fresnel lens sheet with a lenticular lens sheet which contains in the interior of the base material two or more kinds of light diffusing material which differ at least in any one of shape, mean particle diameter, and material, and which has a light diffusing layer where at least one kind of light diffusing material of the light diffusing materials comprises an inorganic material, a transmission screen with good dispersibility of the light diffusing material and that reduces color shift can be realized.

The fourth aspect of the present invention is that in the abovementioned transmission screen, a refractive index of a resin constituting the light diffusing substrate is higher than a refractive index of the light diffusing material.

Furthermore, a refractive index ratio of the resin and the light diffusing material is preferably in a range of resin: light diffusing material=1:0.7 to 1. Moreover a refractive index difference of the resin and the light diffusing material is preferably in a range of 0 to 0.2.

Furthermore, a thickness of the light diffusing layer may be in a range of 1 to 60 μm, a dosage of the light diffusing material may be in a range of 5 to 40 parts by weight for 100 parts by weight of the light diffusing layer, and a mean particle diameter of the light diffusing material may be in a range of 1 to 30 μm, and a standard deviation of the mean particle diameter according to a laser diffraction scattering method may be less than 6 μm.

According to the above aspects, in the transmission screen, by setting the refractive index of the transmissive resin other than the light diffusing material constituting the light diffusing layer higher than the refractive index of the particles, then even for a thinner screen which uses a projector using a high-intensity light source, a light diffusion screen where hot bar is reduced and scintillation is mitigated can be realized.

The fifth aspect of the present invention is a display device of a type which forms a display light by projecting an illumination light onto image display elements in which a display image is regulated by transmission/non transmission (or, transmission /light diffusion) or selective reflection, and is equipped with the above transmission screen, either alone or in combination with another lens sheet.

The sixth aspect of the present invention is a light diffusing substrate having a light diffusing layer made by dispersing and mixing a light diffusing material into a resin, and in the light diffusing layer, a dispersion density of the light diffusing material differs in at least two layers in the thickness direction.

According to the above aspect, since the light diffusing layer is a multilayer configuration, then this is ideal for the whole of the light diffusing substrate, or for when desirably controlling the light diffusion characteristic corresponding to the lens characteristic of the lens sheet.

Furthermore, if it is a light diffusing layer constituted by only one layer having a uniform dispersion density of the light diffusing material, then in the case where it has sufficient light diffusivity for practical use, if the mixed quantity of the light diffusing material increases, irregularities on the surface become noticeable which presents a rough appearance, and the reflectivity of the external light becomes higher. However, by arranging the light diffusing layer of a low density on the viewer side, the appearance becomes one with a moderate matte look and moderate reflectivity of external light.

The seventh aspect of the present invention is a light diffusing substrate having a light diffusing layer made by dispersing and mixing a light diffusing material into a resin, wherein the light diffusing substrate is mainly composed of an organic material, the light diffusing layer contains at least two kinds of light diffusing material which differ at least in any one of shape, mean particle diameter, and material, and at least one kind of light diffusing material of the light diffusing materials comprises an inorganic material.

According to the embodiment, since it contains in the interior of the light diffusing substrate, two or more kinds of light diffusing material which differ at least in any one of shape, mean particle diameter, and material, and has a light diffusing layer where at least one kind of light diffusing material of the light diffusing materials comprises an inorganic material, then this is ideal for the whole of the light diffusing substrate, or for when desirably controlling the light diffusion characteristic corresponding to the lens characteristic of the lens sheet.

BRIEF DESCRIPTION OF THE DRAWINGS

FIG. 7 is a table showing screen characteristics for the respective examples and comparison examples.

DETAILED DESCRIPTION OF THE INVENTION

Hereunder is a description of a first embodiment of the present invention.

In the following description, a lenticular (lens section) having a function for refracting an incident light in a horizontal direction is called a "horizontal lenticular" and a lenticular (lens section) having a function for refracting in a vertical direction is called a "vertical lenticular."

Figure 1A:
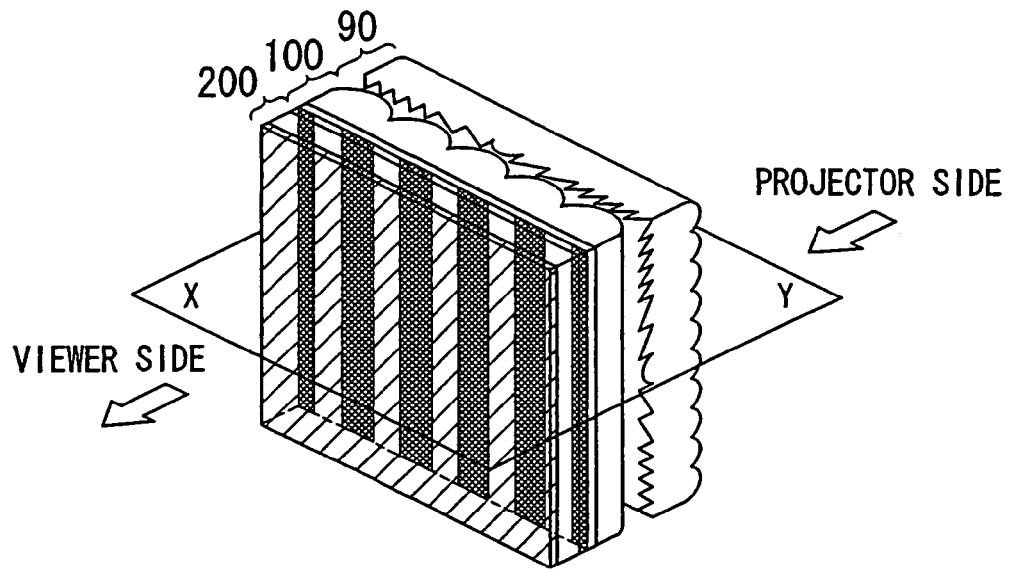
FIG. 1A and FIG. 1B are explanatory diagrams showing an example of a configuration of a transmission screen of a first embodiment of the present invention, FIG. 1A being a perspective view and FIG. 1B being a cross-section on the X-Y plane.
Figure 1B:
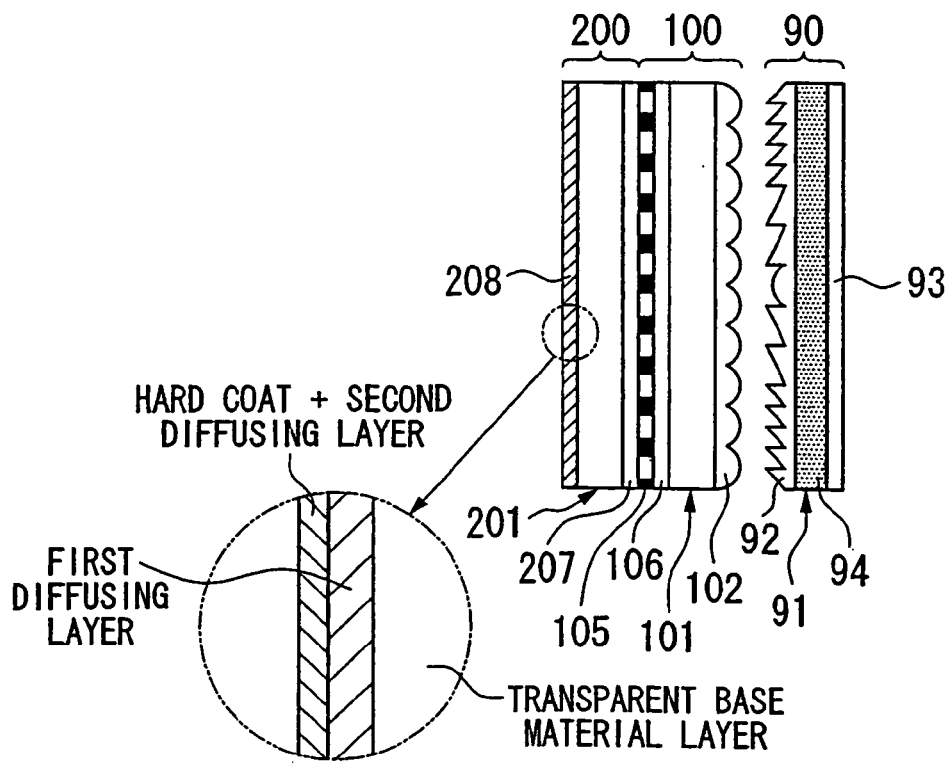

FIG. 1A and FIG. 1B are explanatory diagrams showing an example of a configuration of a transmission screen of the present invention, FIG. 1A being a perspective view and FIG. 1B being a cross-section on the X-Y plane.

In a Fresnel lens sheet 90, on one surface of a light diffusing substrate 91 (non projector side) is formed a lens section 92 having a resin such as a reacted product of a radiation ray-curable-resin. On the other surface (projector side), a vertical lenticular 93 is formed.

Examples of resin base material constituting the, light diffusing substrate 91 include polyester resin, styrene resin, acrylic resin, acrylic-styrene copolymer, polycarbonate resin, vinyl chloride resin sheet, and the like. However, it is not specifically limited.

Furthermore, in the resin base material, a light diffusing material 94 which is mainly composed of globular glass beads or resin crosslink beads of a particle size of 1 to 30 μm is dispersingly mixed.

In a horizontal lenticular lens sheet 100, on the Fresnel lens sheet side of a substrate 101, a group of cylindrical lenses 102 is formed by a resin such as a reacted product of a radioactive-ray-curable-resin. On the other surface, in a position corresponding to a boundary of the cylindrical lens, a stripe-shaped shading layer 105 is formed, on which a light diffusing layer (light diffusing substrate) 200 is laminated.

For the substrate 101, similarly to the above, the material includes polyester resin, styrene resin, acrylic resin, acrylic-styrene copolymer, polycarbonate resin, vinyl chloride resin sheet, and the like. However, the material is not limited to these.

The light diffusing substrate 200 has a configuration where on one surface of a transparent resin substrate 201 which does not contain a light diffusing material, two or more layers of a resin layer (light diffusing layer) 208 containing a light diffusing material are laminated, and is laminated via an adhesive layer 207 so that the side which does not contain a light diffusing material faces to the aforementioned shading layer 105 side.

As the resin base material constituting the light diffusing substrate 200, resin board that has rigidity and excellent light transmittance, such as acrylic resin, acrylic-styrene copolymer (MS resin), and polycarbonate resin may be used, however, it is not specifically limited.

The light diffusing layer 208 has a configuration where the dispersion density of the light diffusing material differs over two or more layers in the substrate thickness direction. This is shown enlarged in the same drawing.

In the present embodiment, on the transparent substrate 201, a first light diffusing layer and second light diffusing layer are formed in this sequence. For the second light diffusing layer, there is a case where it concurrently functions as a hard coat layer being one of the surface treatments. In a formula for formula forming the second light diffusing layer, a filler for imparting abrasion resistance is included in addition to the light diffusing material.

The first light diffusing layer is formed by coating at a film thickness of around 20 μm, an acrylic resin in which inorganic diffusing agent such as silica is dispersed at a density of 30%.

The second light diffusing layer is formed by coating at a film thickness of around 20 μm, an acrylic resin in which organic bridge beads such as acrylic or MS are dispersed at a density of 15%.

The second light diffusing layer is not limited to that mentioned above (hard coat treatment), and may concurrently have various functions such as antistatic treatment, or antireflection treatment.

Furthermore, in some cases ultraviolet-curing-paint is used for the first and second light diffusing layer.

The ultraviolet-curing-paint is mainly composed of a polymer, oligomer, monomer, or the like, which generally has a radical polymeric double bond or epoxy radical within the structure as a film forming component, and besides contains a photoinitiator or sensitizer.

Preferably, by using a polyfunctional (meta) acrylate ultraviolet-ray-curable-paint in which the film forming component has an acrylate functional group, then specifically, a hard coat layer of the second layer which is superior in surface hardness, transparency, friction-resistance, and abrasion resistance may be formed concurrently with the diffusing layer.

In the method for applying the ultraviolet-ray-curable-paint on the resin board, specifically, gravure coating, gravure reverse coating, reverse roll coating, offset gravure coating which are superior in the accuracy of application thickness, the smoothness of application surface, and the like are preferable.

Furthermore, by using a transfer sheet where a hard coat layer is a transfer layer, it may be formed by transferring.

In the case where the second light diffusing layer made by ultraviolet-ray-curable-paint concurrently performs light diffusion, hard coat, and antistatic, then in general a fine powder such as a surfactant is added to the ultraviolet-ray-curable acrylic resin as an antistatic agent. The kind of antistatic agent, and the dosage are not specifically limited.

As an antireflection layer, on the surface of the second light diffusing layer, a film composed of a low refractive index material, a transparent fluorocarbon resin, or a fluorocarbon inorganic compound, may be formed into a light diffusing substrate by application or vapor deposition, however, the low refractive index material or the forming method are not specifically limited. As a result, the external light contrast is improved and the image can be viewed without reflection.

The light diffusing layer, from the point of light diffusion characteristics and rigidity, generally requires a thickness of around 0.5 to 2 mm.

In the case of the above embodiment, the light diffusing substrate 91 in the Fresnel lens sheet 90 is a resin layer (light diffusing layer) the whole of which contains light diffusing material. However, in the light diffusing substrate 200, the most part is formed by the transparent resin substrate 201, and the light diffusing layer 208 is in a thickness ratio of no more than a part (around 20 to 100 μm) of the whole body.

In the light diffusing layer, there are various limitations regarding for example, the refractive index difference between the light diffusing material (particle) and the resin into which it is dispersing and mixed, and the preferable combinations and forming methods from the point of dispersing and mixing the ingredients evenly for the whole body. A sheet-like light diffusing substrate, where the whole body includes a light diffusing layer with a thickness having sufficient rigidity (around 0.5 to 2 mm), occupies a high proportion of the cost of the whole screen.

According to the configuration of the above embodiment, a light diffusing substrate the whole of which includes a light diffusing layer is only on the Fresnel lens sheet 90 side, and a substrate on the horizontal lenticular lens sheet 100 side has a low cost configuration, and the light diffusing layer is comparably thin. Consequently, the high-definition of the image quality can be achieved without decreasing display brightness or resolution.

The light diffusing layer on the horizontal lenticular lens sheet 100 side has a multilayer configuration, and control of the light diffusion characteristic is facilitated by combinations thereof. Therefore the vertical light diffusion characteristic particularly for the important "hot bar avoidance", can be controlled by also including a combination of pitch and lens characteristic (range of emission angles) of the vertical lenticular 93 in the Fresnel lens sheet 90.

Furthermore, due to the synergism of the refracting and diffusing function of the vertical image light corresponding to the vertical lenticular 93 in the Fresnel lens sheet 90, and the refracting and diffusing function in the horizontal direction due to the horizontal lenticular lens sheet 100, the quantity of light of the screen display can be controlled evenly so that a screen of even brightness can be obtained.

The light diffusing material (particles) 94 constituting the light diffusing substrate 91 in the Fresnel lens sheet 90 is mainly in the form of globules of organic light diffusing material with a particle diameter of 10 to 100 μm.

The reason why the abovementioned are preferable as the light diffusing material on the Fresnel lens sheet side is that with an inorganic light diffusing material the form is generally irregular, which causes random light diffusion. As a result, when it is used on the Fresnel lens sheet side, the projected light from projector is randomly diffused and then shone into the Fresnel lens section, so that the characteristics due to the Fresnel lens sheet are spoiled.

However, with a light diffusing material composed of an organic diffusing agent, it is easy to obtain the globular and uniform shape, so that the characteristics due to the Fresnel lens sheet are not spoiled, and this is thus preferable when emitting onto the horizontal lenticular lens sheet side.

Transmitted light (La) of projected light from the projector which has passed through the light diffusing layer of the Fresnel lens sheet, can be represented by the sum of parallel light (L1) and diffused light (L2).

The transmitted light (La) has its optical path refracted in the Fresnel lens section and is then incident on the lens surface of the horizontal lenticular lens sheet, and output to the viewer side.

The transmitted light which has passed through the Fresnel lens sheet, is incident on the lens surface of the horizontal lenticular lens sheet, and then when passing through the screen opening section corresponding to the light-condensing section except for the shading layer 105, the parallel light (L1) component is less than the diffused light (L2) component. Consequently, even in the case where the proportion (BS ratio) occupied by the shading layer (BS: black stripe) is more than 50%, shading due to the BS are small, the utilization efficiency of the projected light from the projector is high, and a bright display image can be viewed.

The BS ratio (%) is represented by 100× shading section/ (opening section+shading section).

Figure 4:
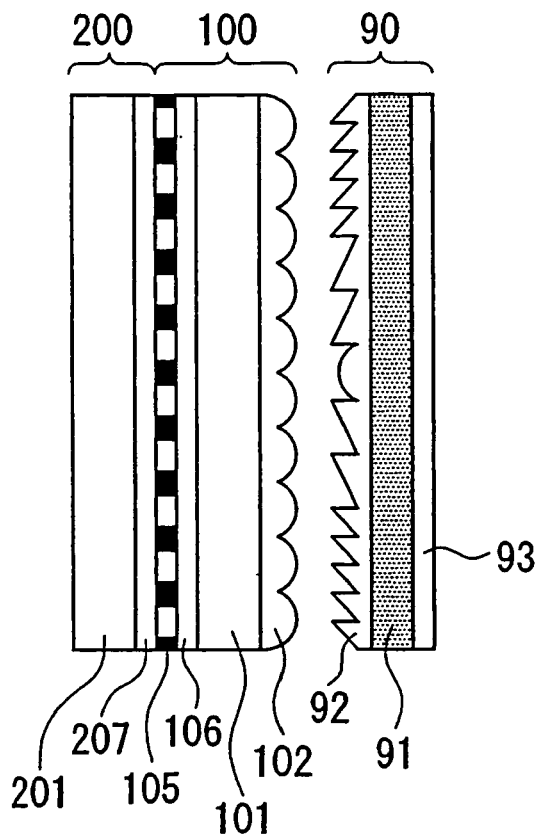
FIG. 4 differs from the present invention, and is an explanatory diagram showing a transmission screen related to a configuration in contrast to the screen shown in FIG. 1A and FIG. 1B.

FIG. 4 is an explanatory diagram showing a configuration of a screen using a substrate 200 which is composed only of a transparent resin substrate 201 and does not have a light diffusing layer. It is a configuration for comparison with the present invention shown in FIG. 1. In the case where there is no light diffusing layer on the viewer side from the shading layer 105, the larger the angle of view becomes, the narrower the horizontal viewing angle tends to become.

This is because, comparing the case where a light diffusing layer is on the viewing surface and the case where it is not, the light which has passed through the opening section (light passing section of the non BS section) diffuses more in the former case than in the latter case. Consequently, the viewing angle is enlarged as a whole (refer to FIG. 5 and FIG. 6).

Figure 5:
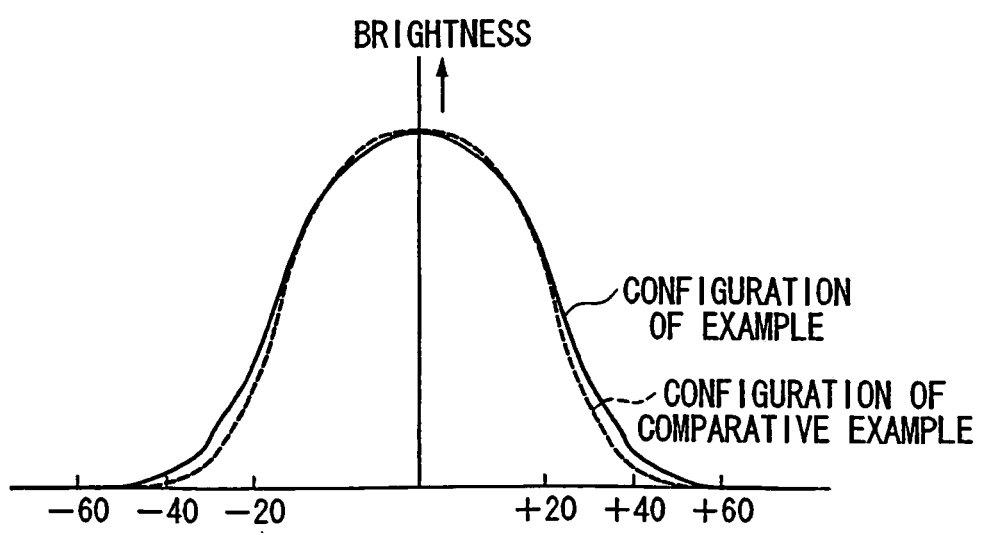
FIG. 5 is a graph showing a relation between screen viewing direction (angle of view) and viewing brightness.
Figure 6:
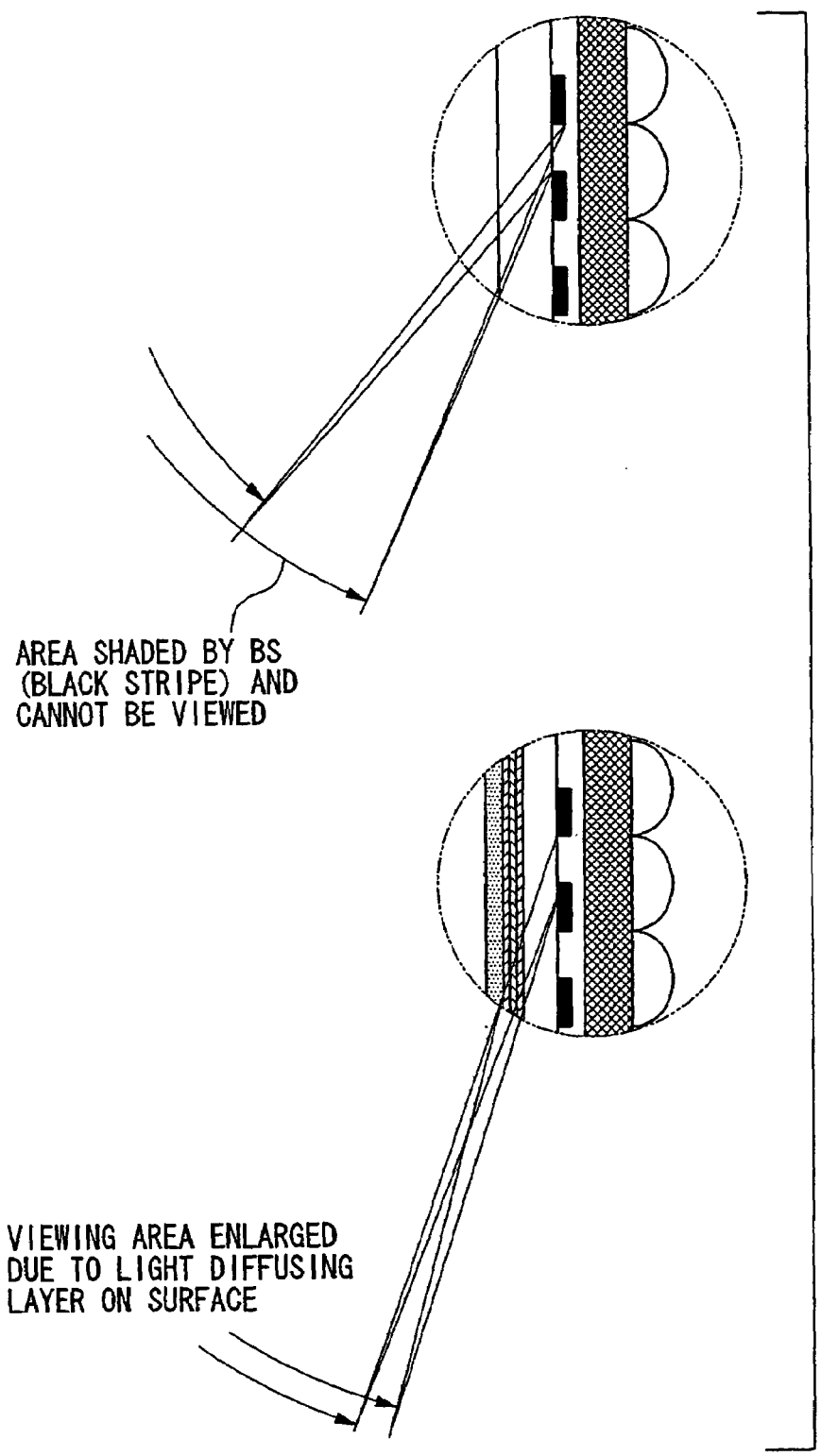
FIG. 6 is an explanatory diagram schematically showing that in the case where a light diffusing layer is on a viewer side, the horizontal viewing angle is widened by light diffusion.

FIG. 5 is a graph showing a relation between screen viewing direction (angle of view) and viewing brightness. The solid line denotes the characteristics in the case where there is a light diffusing layer on the viewer side, and the broken line denotes the characteristics in the case where there is not a light diffusing layer on the viewer side FIG. 6 is an explanatory diagram schematically showing that in the case where a light diffusing layer is on the viewer side, the horizontal viewing angle is widened by light diffusion.

Hereunder is a description of examples of the first embodiment of the present invention.

The following is a description comparing examples 1 to 5 where light diffusing layers are provided as two-layer structures on a transparent resin substrate, as a light diffusing substrate positioned on the viewer side of the lenticular lens sheet, with comparative example 1 where a light diffusing layer is not provided on the transparent resin substrate, and comparative example 2 where a light diffusing material is dispersing and mixed evenly throughout.

EXAMPLE 1

On one surface of a transparent resin substrate (acrylic resin of 2 mm thickness), light diffusing layers as shown in (a) and (b) hereunder were applied in this sequence and formed. The application thickness was 20 μm for both.
(a) first light diffusing layer containing organic diffusing agent at a density of 30%
(b) second light diffusing layer containing organic diffusing agent at a density of 15%

EXAMPLE 2

On one surface of a transparent resin substrate (acrylic resin of 2 mm thickness), light diffusing layers as shown in (a) and (b) hereunder were applied in this sequence and formed. The application thickness was 20 μm for both.
(a) first light diffusing layer containing organic diffusing agent at a density of 15%
(b) second light diffusing layer containing organic diffusing agent at a density of 30%

EXAMPLE 3

On one surface of a transparent resin substrate (acrylic resin of 2 mm thickness), light diffusing layers as shown in (a) and (b) hereunder were applied in this sequence and formed. The application thickness was 20 μm for both.
(a) first light diffusing layer containing organic diffusing agent at a density of 15%
(b) second light diffusing layer containing organic diffusing agent at a density of 15%

EXAMPLE 4

On one surface of a transparent resin substrate (acrylic resin of 2 mm thickness), light diffusing layers as shown in (a) and (b) hereunder were applied in this sequence and formed. The application thickness was 20 μm for both.
(a) first light diffusing layer containing inorganic diffusing agent at a density of 30%
(b) second light diffusing layer containing organic diffusing agent at a density of 15%

EXAMPLE 5

On one surface of a transparent resin substrate (acrylic resins of 2 mm thickness), light diffusing layers as shown in (a) and (b) hereunder were applied in this sequence and formed. The application thickness was 20 μm for both.
(a) first light diffusing layer containing organic diffusing agent at a density of 30%
(b) second light diffusing layer containing inorganic diffusing agent at a density of 15%

COMPARATIVE EXAMPLE 1

A transparent resin substrate with nothing applied to the surface (acrylic resin of 2 mm thickness).

COMPARATIVE EXAMPLE 2

A resin sheet extrusion formed by mixing organic light diffusing material (MS resin of 2 mm thickness).

Figure 2:
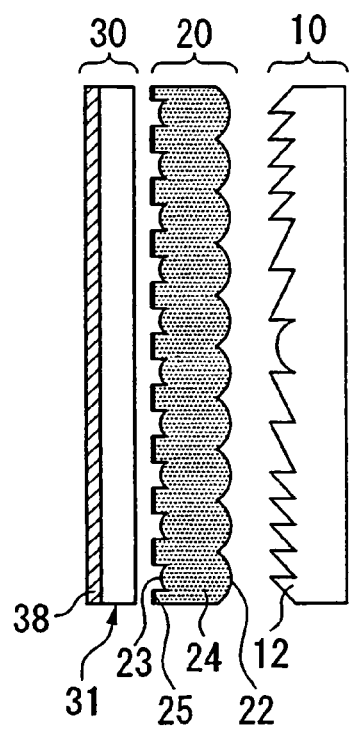
FIG. 2 is a cross-section showing a configuration of a transmission screen used for a CRT projection-type rear projection television.

Various substrates of configurations related to examples 1 to 5 and comparative examples 1 and 2 were used as a protection sheet in a transmission screen (conventional transmission screen) for the CRT protection sheet rear projection television shown in FIG. 2, and the respective screen performances were evaluated.

FIG. 7 is a table showing screen characteristics for the respective examples and comparison examples.

Firstly, when comparing configurations where light diffusing layers are provided on the viewer side (examples 1 to 5), with a configuration where a light diffusing layer is not provided (comparative example 1), in the comparative example 1, it is seen that yH which denotes the width of the horizontal viewing angle (the angle to give a reduction in brightness of ¹/₁₀ when moving in a transverse direction, with the front face=0°), and δH (similarly, an angle to give a reduction to ¹/₂₀) are smaller compared to examples 1 to 5.

This means that the height of the bottom part of the curve shown by the dotted line (comparative example 1) in FIG. 5 drops down.

On the other hand, the bottom part of the curve shown by the solid line (examples 1 to 5) maintains a higher brightness than for the dotted line.

The comparison of examples 1 to 5 and comparative example 2 were evaluated under the item of sharpness, by visual observation of the display image. In the examples 1 to 5, since the light diffusing layer was obviously thin, image blurring was less and image sharpness was high.

Next, when comparing between examples 1 to 5, the ones with the lower dispersion density of the light diffusing material in the second light diffusing layer (examples 1, 3, 4, 5) had better surfaces of view than the ones with higher dispersion density (example 2), and there was also the result of less irregular reflection on the surfaces due to external light (denoted by external light reflectance). A good or bad of appearance of the viewing surface was evaluated by visual observation.

So that the appearance of the viewing surface is good, and irregular reflection on the surfaces from external light is low, the dispersion density of the light diffusing material in the second light diffusing layer, which becomes the outer most surface, is preferably around 15%.

In order to widen the viewing angle, the dispersion density of the light diffusing material should be high, and preferably around 30% for screen use.

If the light diffusion characteristic (viewing angle) is given priority, the external appearance is damaged and irregular reflection on the surface becomes significant, as mentioned above. In order to concurrently maintain the light diffusion characteristic (viewing angle) and good external appearance, it is preferable that the dispersion density of the light diffusing material is lower on the second light diffusing layer side and higher on the first light diffusing layer side (examples 1, 4 and 5).

In observation of a projection-type rear projection television (for either a CRT or liquid crystal), in the case where the light diffusing layer has a certain thickness, then when viewed from a different angle, a slight color change becomes a problem attributable to the change in the optical path length (in the line of sight direction) in the light diffusing layer.

This is assumed to be because the extent to which the projected display light goes via the light diffusing substrate, changes corresponding to the change in the optical path length (in the line of sight direction) within the light diffusing layer.

The aforementioned color change is expressed in the same diagram as the horizontal color change ($\Delta x$) and the vertical color change ($\Delta y$), and the smaller these are the better.

The examples 1, 2 and 3 are comprised of only organic diffusing agent, while the examples 4 and 5 contain inorganic diffusing agent. It is seen that the latter show less color change.

This is assumed to be because the inorganic diffusing agent such as silica and alumina has an irregular shape, has larger light diffusion, and is more random than the globular organic diffusing agent as bridge beads such as acrylic and MS.

In a comparison between examples 4 and 5, it is noticeable that example 4 using more of the inorganic diffusing agent with larger light diffusion, in the second light diffusing layer, shows less color shift.

Figure 3:
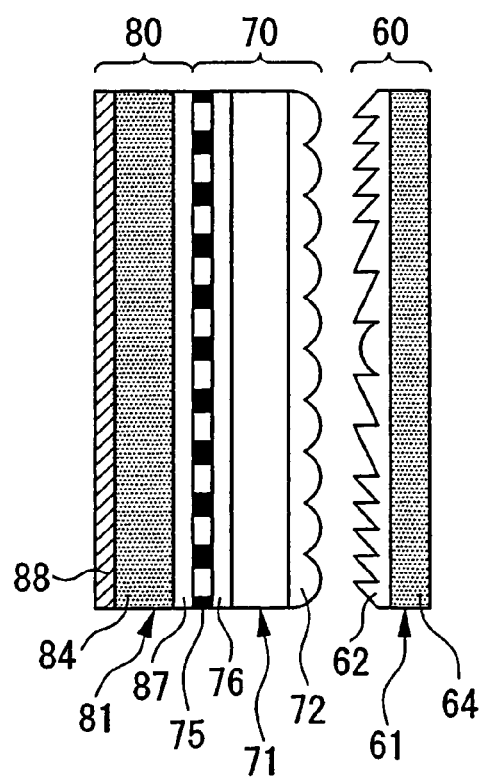
FIG. 3 is a cross-section showing a configuration of a transmission screen used for a liquid crystal projection-type rear projection television.

The above examples (comparative examples) describe the case where multilayer light diffusion by the present invention is applied to a transmission screen (conventional transmission screen) for a CRT rear-projection screen television as shown in FIG. 2. However, the present invention is also applicable to a transmission screen for a liquid crystal rear-projection screen television (FIG. 1, FIG. 3).

Specifically, a screen related to the configuration in FIG. 1 is preferable for application of the present invention.

This is because "the light diffusing substrate included entirely of a light diffusing layer made by extrusion forming" used on both the Fresnel lens sheet side and the horizontal lenticular lens sheet side as above described, is applied to only one side (the Fresnel lens sheet side), and hence the cost for the horizontal lenticular lens sheet side can be reduced.

In this case, with a thickness of the light diffusing layer in an amount for applying and forming on one side of the transparent resin substrate, specifically in the vertical direction, the viewing angle is not sufficiently widened. Consequently, a screen related to the configuration of FIG. 1 using a Fresnel lens sheet on which a vertical lenticular is formed on the projector side, demonstrates the best operation and effect by the present invention.

Next is a description of a second embodiment of the present invention.

FIG. 8 is a perspective view showing an example of a transmission screen which is formed by combination of a Fresnel lens sheet with a lenticular lens sheet of the present invention.

Figure 8A:
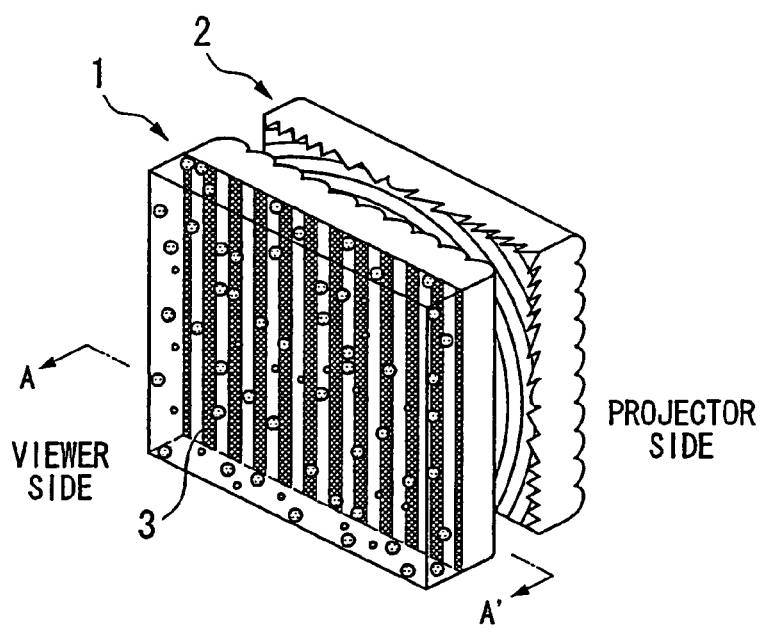
FIG. 8A is a perspective view showing an example of a transmission screen of a second embodiment of the present invention.
Figure 8B:
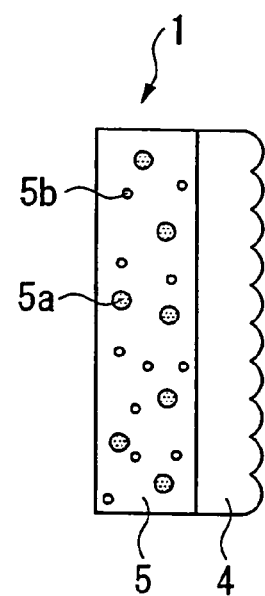
FIG. 8B is a cross-section on A–A' of the lenticular lens sheet of the present invention shown in FIG. 8A.

As shown in FIG. 8A, there is shown an example of a transmission screen of a configuration combined and arranged such that; by using a lenticular lens sheet 1 of the present invention, a stripe-shaped shading layer 3 is provided in an area where image light does not pass, and a Fresnel lens sheet 2 is combined so that the light diffusing layer of the lenticular lens sheet faces to the viewer side and the Fresnel lens sheet faces to the projector side. FIG. 8B shows a cross-section on A–A' of the lenticular lens sheet of the present invention, showing an example of a configuration where on one surface of a base material 5 in which two kinds of inorganic light diffusing materials 5a and 5b of different particle diameter are dispersed, a half-column-cylindrical-lens-group 4 is formed.

Hereunder is a description of color shift of a transmission screen.

Figure 14:
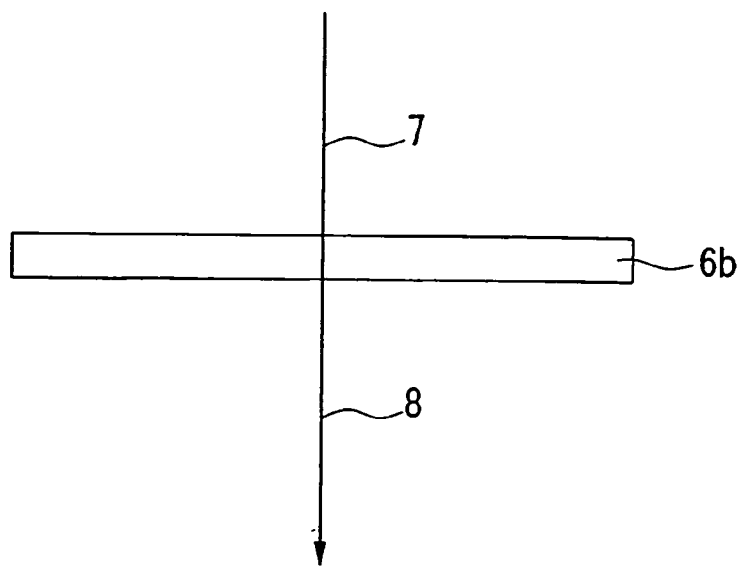
FIG. 14 is an explanatory diagram for explaining a condition where projected light incident from a projector to a transmission screen not using light diffusing material, is not dispersed by a light diffusing material, and directly reaches to the viewer side.

In a transmission screen not using a light diffusing material, when projected light from the projector passes through the screen, it is not dispersed by a light diffusing material, and directly reaches to the viewer side (refer to FIG. 14). Therefore, via the screen, tiny shifts of R, G, B caused by slight differences in the color mixing optical system of the projector are directly observed, and consequently color shift becomes large.

Figure 15:
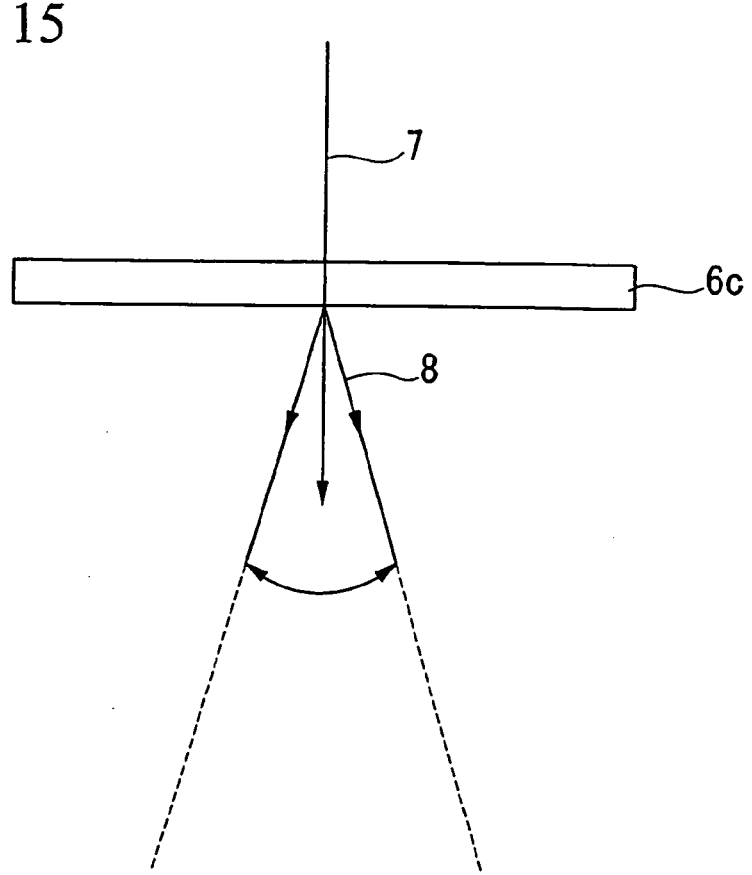
FIG. 15 is an explanatory diagram for explaining a condition where projected light incident from a projector to a transmission screen having a light diffusing layer composed of organic light diffusing material, is diffused by the light diffusing material, and reaches to the viewer side.

In a conventional transmission screen using an organic light diffusing material as the light diffusing material, when projected light from the projector passes through the screen, it is dispersed by the light diffusing material and reaches to the viewer side (refer to FIG. 15). Therefore, via the screen, tiny shifts of R, G, B caused by slight differences in the color mixing optical system of the projector are respectively dispersed and observed.

Figure 13:
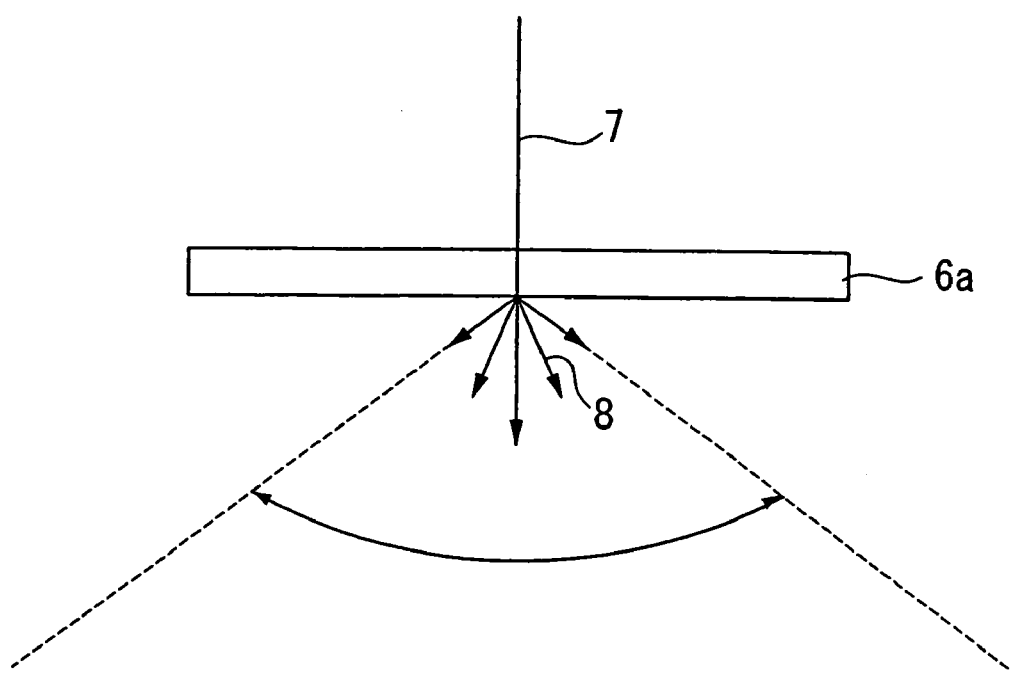
FIG. 13 is an explanatory diagram for explaining a condition where projected light incident from a projector to a transmission screen having a light diffusing layer essentially containing an inorganic light diffusing material in the present invention, is dispersed by the light diffusing material, and reaches to the viewer side.

In a transmission screen of the present invention using a lenticular lens sheet which necessarily contains an inorganic light diffusing material, when projected light from the projector passes through the screen, it is dispersed by the light diffusing material and reaches to the viewer side (refer to FIG. 13). Therefore, via the screen, tiny shifts of R, G, B caused by slight differences in the color mixing optical system of the projector are respectively dispersed and observed.

The base material constituting the light diffusing layer of the transmission screen, often includes a plastics material, and attention is given to the refractive index difference between the base material and the light diffusing material. Comparing the case using an organic light diffusing material and the case using an inorganic light diffusing material, the former has less refractive index difference between the base material, and the latter has more refractive index difference between the base material. The greater the refractive index difference between the base material and the light diffusing material, the wider the range where the same chromaticity is observable, and there is an effect to reduce color shift.

Next, for the inorganic light diffusing material which forms the light diffusing layer of the lenticular lens sheet in the present invention, it is preferable to have an irregular shape. The function for reducing color shift by using an irregular shape is described.

Figure 16:
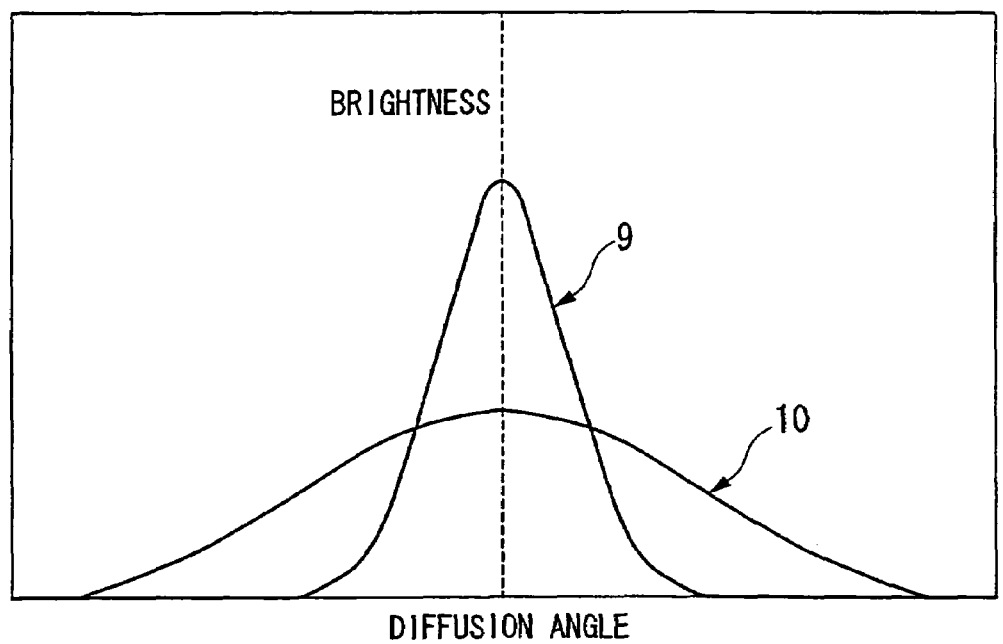
FIG. 16 is a schematic diagram for comparing diffusion angles of a transmission screen having a light diffusing layer including an inorganic light diffusing material of an irregular shape, and a transmission screen having a light diffusing layer including a globular organic light diffusing material.

The diffusion angle is determined corresponding to the particle diameter of the light diffusing material. FIG. 16 is a comparison of a diffusion angle curve 10 for the case of a globular shaped light diffusing material, and a diffusion angle curve 9 for the case of an irregular shaped light diffusing material. In the case of the irregular shaped light diffusing material, it is possible to take a wide diffusion angle. The greater the diffusion angle, the wider the range where the same chromaticity is observable, and there is an effect to reduce color shift.

Next is a description to compare the dispersibility of the light diffusing material between a case where light diffusing materials of the same particle diameter are dispersed and a case where two or more kinds of light diffusing materials of different particle diameter are dispersed.

In the case where light diffusing materials of the same particle diameter are dispersed, the light diffusing materials tend to be arranged in matrix form in the base material and thus maintain a stable condition.

In the case where two or more kinds of light diffusing materials of different particle diameter are dispersed, the stable matrix form array state comprising light diffusing materials of the same particle size is disturbed by at least one kind of light diffusing material of different particle size. As a result, the light diffusing materials become in an unstable array state and dispersibility is increased.

By making at least one kind of light diffusing material for dispersing in the light diffusing layer of the lenticular lens sheet of the present invention an inorganic light diffusing material, and taking a wide refractive index difference between the base material composed of organic material and the light diffusing material, there is an effect to reduce color shift. Consequently, a transmission screen that reduces color shift can be realized.

By making the light diffusing material for dispersing in the light diffusing layer of the lenticular lens sheet of the present invention, an inorganic light diffusing material of irregular shape, a transmission screen that reduces color shift can be realized.

By dispersing two or more kinds of light diffusing materials of different particle diameter in the light diffusing layer of the lenticular lens sheet of the present invention, a transmission screen of good dispersibility can be realized.

In the present invention, by making the light diffusing material in the light diffusing substrate have a combination of at least two or more kinds differing in shape, mean particle diameter, or material, and also making at least one kind of material be composed of an inorganic material, a transmission screen of good dispersibility of the light diffusing material and that reduces color shift can be realized.

Hereunder is a description of an example of the second embodiment of the present invention for the case where a liquid crystal projector is used as an image display.

EXAMPLE 6

In a configuration from the light source side of a Fresnel lens sheet without a light diffusing material, and a lenticular lens sheet having a light diffusing layer kneaded with two kinds of globular inorganic light diffusing materials of different particle diameter (refer to FIG. 8A), the chromaticity was measured and evaluated by a color brightness photometer. The evaluation results are shown in FIG. 17.

Figure 17:
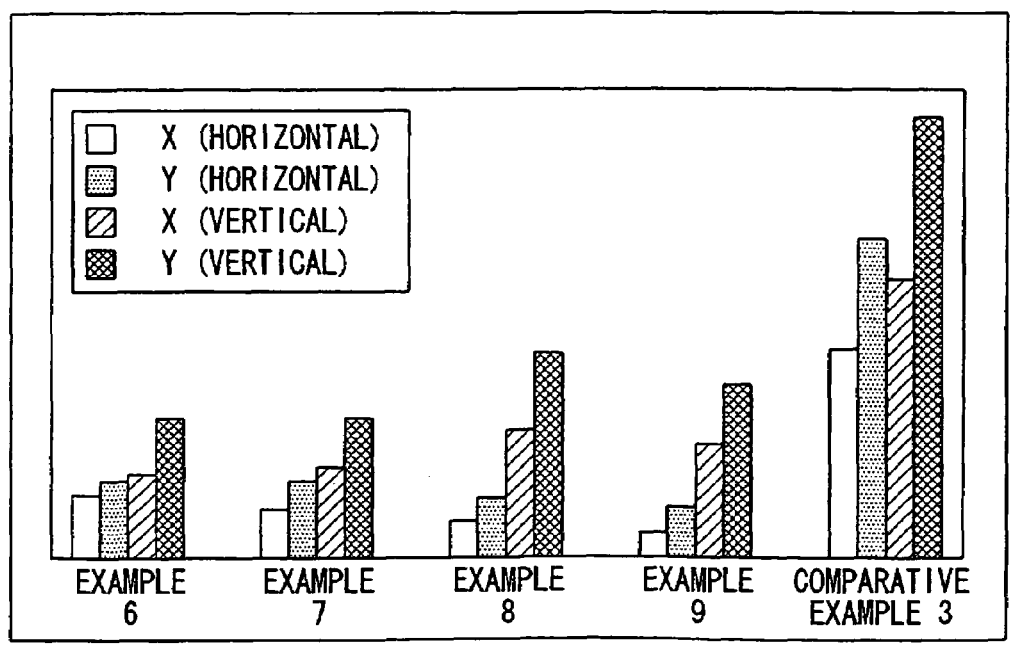
FIG. 17 is a graph showing chromaticity of an XYZ calorimetric system (x, y) which becomes a base for respective colorimetric systems as a CIE standard calorimetric system.

FIG. 17 is a graph showing the chromaticity of an XYZ calorimetric system (x, y) which becomes a base for respective colorimetric systems as a CIE standard calorimetric system.

Here x (horizontal), y (horizontal) denote chromaticity (x, y) measured in the horizontal direction, and x (vertical), y (vertical) denote chromaticity (x, y) measured in the vertical direction. The vertical axis in the graph denotes the size of chromaticity (x, y). Compared to example 3, differences in chromaticity are remarkably reduced.

EXAMPLE 7

Figure 9:
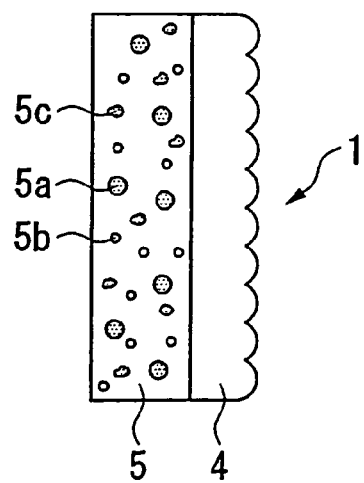
FIG. 9 is a cross-section on A–A' showing a different configuration of the lenticular lens sheet as an embodiment of the present invention.

In a configuration from the light source side of a Fresnel lens sheet without a light diffusing material and a lenticular lens sheet having a light diffusing layer kneaded with two kinds of globular inorganic light diffusing materials of different particle diameter and one kind of irregular shaped inorganic light diffusing material (refer to FIG. 9), the chromaticity was measured and evaluated by a color brightness photometer. The evaluation results are shown in FIG. 17. Compared to example 3, differences in chromaticity are remarkably reduced.

EXAMPLE 8

Figure 10:
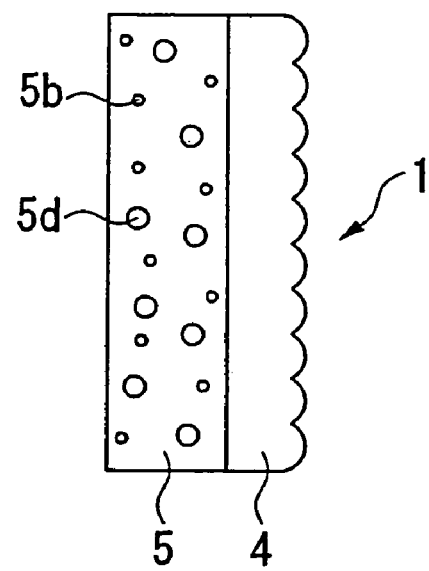
FIG. 10 is a cross-section on A–A' showing a different configuration of the lenticular lens sheet as an embodiment of the present invention.

In a configuration from the light source side of a Fresnel lens sheet without a light diffusing material, and a lenticular lens sheet having a light diffusing layer kneaded with one kind of globular organic light diffusing material and one kind of inorganic light diffusing material with a smaller particle diameter than that of the organic light diffusing material (refer to FIG. 10), the chromaticity was measured and evaluated by a color brightness photometer. The evaluation results are shown in FIG. 17. Compared to example 3, differences in chromaticity are remarkably reduced.

EXAMPLE 9

Figure 11:
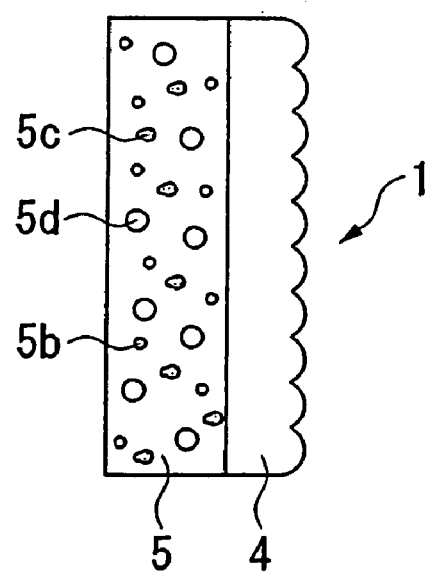
FIG. 11 is a cross-section on A–A' showing a different configuration of the lenticular lens sheet as an embodiment of the present invention.

In a configuration from the light source side of Fresnel lens sheet without a light diffusing material, and a lenticular lens sheet a light diffusing layer kneaded with one kind of globular organic light diffusing material, one kind of inorganic light diffusing material with a smaller particle diameter than that of the organic light diffusing material, and one kind of irregular shaped inorganic light diffusing material (refer to FIG. 11), the chromaticity was measured and evaluated by a color brightness photometer. The evaluation results are shown in FIG. 17. Compared to example 3, differences in chromaticity are remarkably reduced.

COMPARISON EXAMPLE 3

Figure 12:
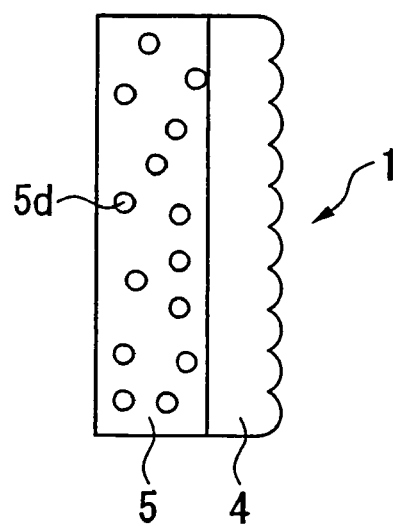
FIG. 12 is a cross-section on A–A' showing a different configuration of the lenticular lens sheet as an embodiment of the present invention.

In a configuration from the light source side of a Fresnel lens sheet without a light diffusing material and a lenticular lens sheet having a light diffusing layer kneaded with one kind of globular organic light diffusing material (refer to FIG. 12), the chromaticity was measured and evaluated by a color brightness photometer. The evaluation results are shown in FIG. 17. The differences in chromaticity are fairly large.

Next is a description of a third embodiment of the present invention.

The transmission (light diffusion) screen according to the present invention is comprised of a light diffusing layer comprising a transmissive resin dispersed with light diffusing material (light diffusive particles), and a transmissive base material, and is set so that the refractive index of the resin other than the light diffusing material is higher than the refractive index of the light diffusing material.

Here, for the refractive index ratio of the resin other than the light diffusing material and the particles, if the former is 1, it is preferable to control so that the latter is in a range of 0.7 to 1, more preferably in a range of 0.9 to 1, and even more preferably in a range of 0.93 to 1.

Furthermore, for the refractive index difference of the resin other than the light diffusing material and the light diffusing material, it is preferable to control so that the refractive index difference is in a range of 0 to 0.2, more preferably in a range of 0 to 0.1, and even more preferably in a range of 0.001 to 0.05.

The light diffusing material used for the transmission screen of the present invention is preferably one with a refractive index ratio and refractive index difference with respect to the transmissive resin other than the light diffusing material, which satisfies the above conditions, and which is transparent and has excellent dispersibility in the resin layer.

Furthermore, the shape is preferably globular, and in particular a spherical shape is more preferable. The mean particle diameter is preferably in a range of 1 to 30 μm, and more preferably in a range of 5 to 20 μm.

Moreover, the standard deviation of the mean particle diameter according to a laser diffraction scattering method is preferably less than 6 μm, and more preferably around 5 μm.

The dosage is preferably in a range of 5 to 40 parts by weight for 100 parts by weight of the light diffusing layer, and more preferably in a range of 10 to 30 parts by weight.

Examples of particles used for such light diffusing material include specifically, particles of organic high molecular compounds comprising acrylic resin, polyurethane resin, and polyamide resin, and particles of inorganic compounds such as silica.

The transmissive resin other than the light diffusing material used for the transmission screen of the present invention is preferably one with a refractive index ratio and refractive index difference with respect to the light diffusing material, which satisfies the above conditions, and which is transparent and has excellent dispersibility of the particles, and also has excellent adhesiveness to the transmissive base material.

Furthermore, it is even more preferable if it has excellent flexibility to avoid cracking when being bent.

The material for the resin layer is not specifically limited as long as it satisfies the above conditions. Examples include thermoplastic resins, thermosetting resins, and energy-beam-curable-resins such as ultraviolet-ray-curable-resins.

Furthermore, in order to avoid contrast decrease, the thickness of the resin layer, that is, the thickness of the light diffusing layer, is preferably in a range of 1 to 60 μm, and more preferably in a range of 20 to 50 μm.

The material of the transmissive material of the transmission screen of the present invention is preferably a transparent base material, including for example plastics base material, however, it is not specifically limited.

For the plastics, a thermoplastic resin, a thermosetting resins, an energy-ray-curable-resin such as an ultraviolet-ray-curable-resin can be used. Examples include; polyolefin resin such as polyethylene, polypropylene, polyolefin resin such as polyethylene terephthalate, cellulose resins such as triacetylcellulose and butyl cellulose, and polystyrene, polyurethane, vinyl chloride, acrylic resin, polycarbonate resin, polyester resin, and the like.

The thickness of the base material is not specifically limited. However, from the aspect of lightening and cost reduction, it is preferably in a range of 10 to 1000 μm, and more preferably in a range of 30 to 500 μm.

Further, in order to increase the adhesiveness with the light diffusing layer, it is possible to perform various treatments on the surface of the base material. Examples of treatment methods includes corona treatment, anchor treatment, saponification treatment, treatment by silane coupling agent, and the like.

Hereunder is a description using the embodiments, of a transmission screen which uses a lenticular lens sheet having a transmission screen according to the present invention.

Here, a liquid crystal projector is used as an image display, and the configuration is from the light source side, a Fresnel lens sheet without a light diffusing material, and a lenticular lens sheet having a transmission screen of the present invention.

EXAMPLE 10

In a transmission screen wherein the refractive index of the resin other than the light diffusing material dispersed in the light diffusing layer is set higher than the refractive index of the light diffusing particles, and the refractive index ratio between the transmissive resin other than the light diffusing material is 0.97, and the refractive index difference is 0.05, and which uses a transmission screen having a light diffusing layer wherein the light diffusing material comprises an organic high molecular compound composed of acrylic resin, and the material of the resin comprises an acrylic resin, hot bar and scintillation were evaluated by visual observation. The evaluation results are shown in Table. 1.

EXAMPLE 11

In a transmission screen wherein the refractive index of the resin layer other than the light diffusing material dispersed in the light diffusing layer is set higher than the refractive index of the light diffusing material, and the refractive index ratio between the transmissive resin other than the light diffusing material is 0.95, and the refractive index difference is 0.08, and which uses a transmission screen having a light diffusing layer wherein the light diffusing material comprises an organic high molecular compound composed of acrylic resin, and the material of the resin comprises an acrylic resin, hot bar and scintillation were evaluated by visual observation. The evaluation results are shown in Table. 1.

COMPARATIVE EXAMPLE 4

In a transmission screen wherein the refractive index of the resin layer other than the light diffusing material dispersed in the light diffusing layer is set lower than the refractive index of the light diffusing material, and the refractive index ratio between the transmissive resin other than the light diffusing material is 1.05, and the refractive index difference is 0.08, and which uses a transmission screen having a light diffusing layer wherein the light diffusing material comprises an organic high molecular compound composed of acrylic resin, and the material of the resin comprises an acrylic resin, hot bar and scintillation were evaluated by visual observation. The evaluation results are shown in Table. 1.

TABLE 1

|  | Hot bar | Scintillation |
| --- | --- | --- |
| Example 10 | A | A |
| Example 11 | B | A |
| Comparative example 4 | D | C |

In Table. 1, "A" denotes that the respective observations were within an acceptable range and the image quality was excellent. "B" denotes that the respective observations were within the acceptable range and the image quality was good. "C" denotes that the respective observations were outside of the acceptable range and the image quality was poor. "D" denotes that the respective observations were generated and the image quality was very poor.

From the results of Table. 1, it is confirmed that in the transmission screen of the present invention, hot bar is reduced and scintillation is mitigated, compared to the screen of comparative example 4.

Next is a description of a fourth embodiment of the present invention.

Figure 18:
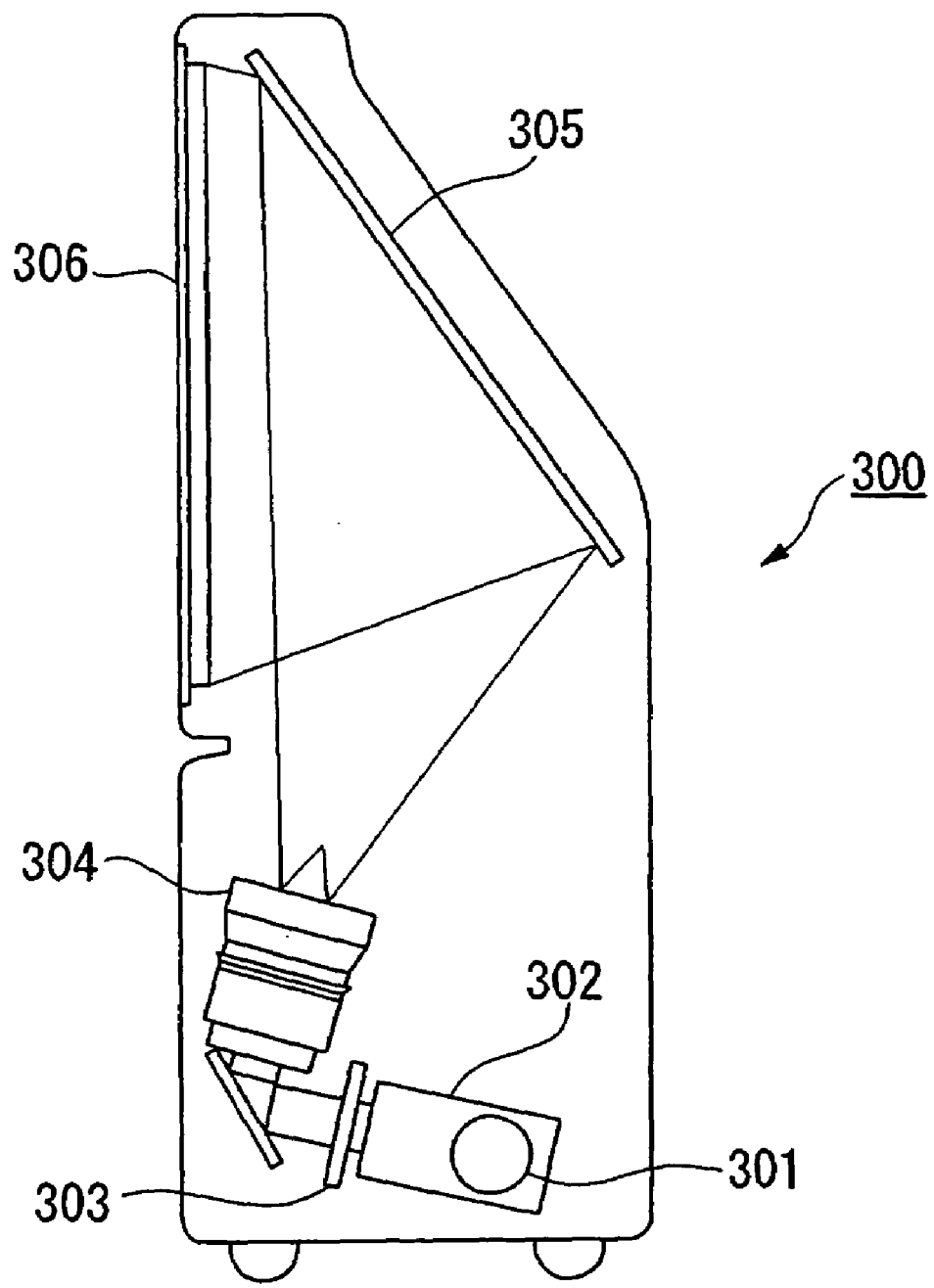
FIG. 18 is a cross-section of a liquid crystal projection-type rear projection television which is an example of a display device of a fourth embodiment of the present invention.

FIG. 18 shows a cross-section of a liquid crystal projection-type rear projection television, as an example of a display device of the present invention.

A rear projection television 300 is normally constructed such that image light projected from a projector having a light source 301, an optical equipment section 302, a liquid crystal panel 303 and a projection lens 304, reaches a viewer via a mirror 305 and a screen 306 including a Fresnel lens sheet having a Fresnel lens section and a lenticular lens sheet having a lenticular lens section.

For the screen (transmission screen) 306 used for the above rear projection television 300, directivity which disperses widely in the horizontal direction and slightly narrower in the vertical direction than in the horizontal direction is demanded. Therefore, generally, a lenticular lens is used as the diffusion element in the horizontal direction, and a light diffusing substrate in which light diffusing material is dispersed, is used as the diffusion element in the vertical direction.

In the present embodiment, as the screen 306, the transmission screen described for the first to third embodiments is employed. Therefore it becomes possible to provide a display device that is bright with high resolution, that has a wide viewing angle in both the horizontal and vertical directions, that is superior in contrast, that enables viewing of sharp images, and further that reduces color shift.

The present invention is not limited to the above embodiments, and various modification can be further made within a range which does not depart from the gist of the present invention.

For example, in the aforementioned embodiment as shown in FIG. 1A and FIG. 1B, the transmission screen is configured to have a Fresnel lens sheet and a lenticular lens sheet, and the light diffusing substrate in which light diffusing material is dispersed, is applied to at least one of the Fresnel lens sheet and the lenticular lens sheet. However, the present invention is not limited to this. For example, it is also possible to apply the light diffusing substrate (light diffusing sheet) of the present invention to a transmission screen of another configuration.

Figure 19A:
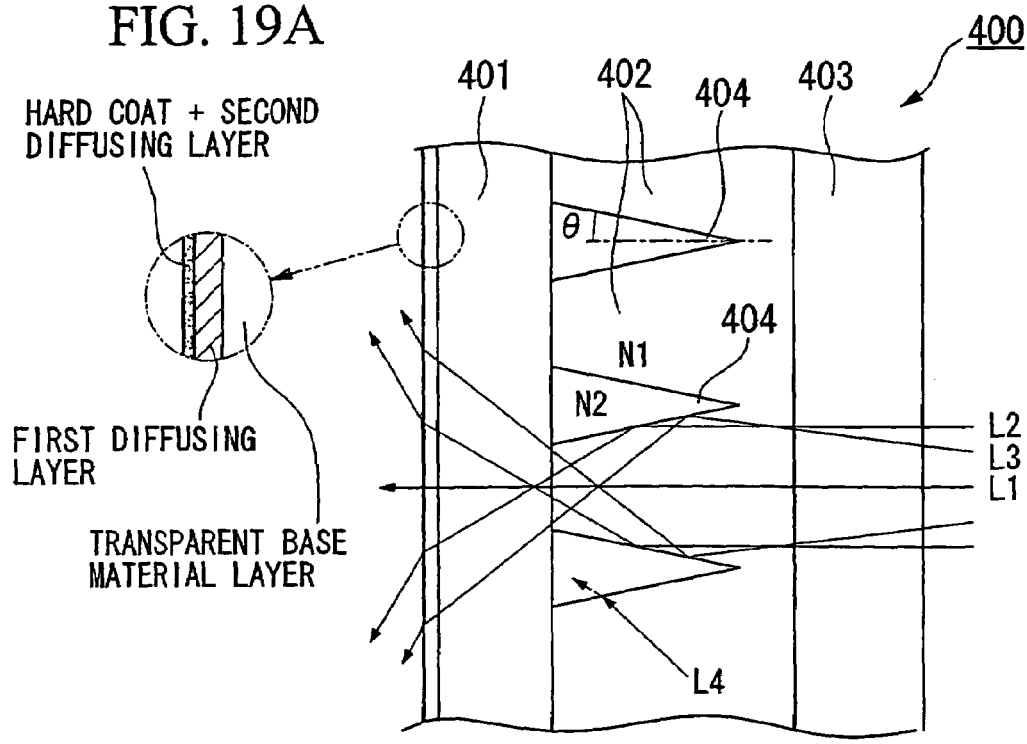
FIG. 19A and FIG. 19B are cross-sections showing a configuration of a transmission screen of another embodiment of the present invention.
Figure 19B:
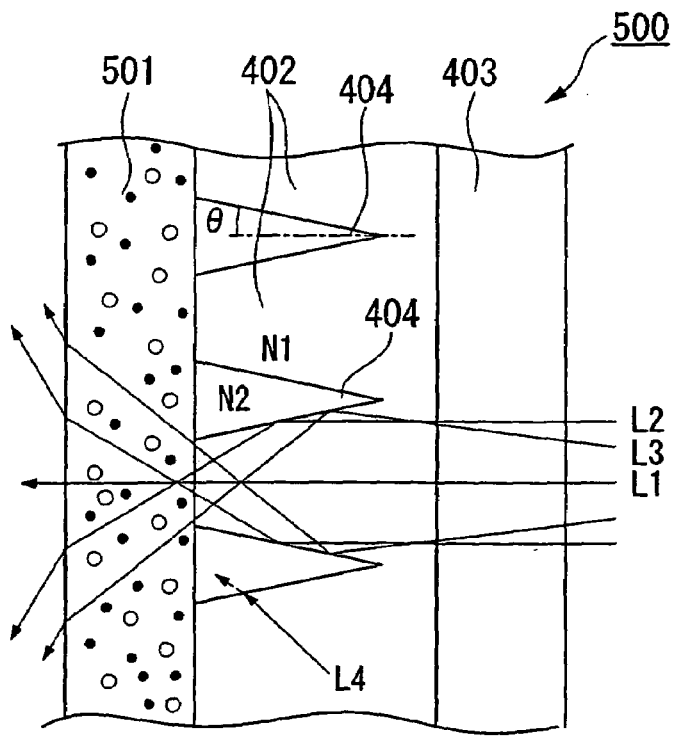

FIG. 19A and FIG. 19B are cross-sections showing an example where the light diffusing substrate of the present invention is applied to a transmission screen of another configuration.

In FIG. 19A, an image light source is arranged on the right side of the drawing, and a viewer is positioned on the left side of the drawing. In this transmission screen 400, sequentially in a direction from the viewer side to the image light source, is arranged stuck together, a light diffusing substrate (a sheet containing a light diffusing material, a light diffusing sheet) 401, unit lenses 402, and a base sheet 403. Furthermore, part of the cross-sectional triangles between the oblique sides of the adjacent respective unit lenses 2, is filled with a material having a lower refractive index than that of the unit lenses 402. Hereunder, the parts filled with the material of lower refractive index are denoted by the "lower refractive index sections 404", and as necessary, the unit lenses 402 are denoted by the "higher refractive index sections 402".

The ratio between a refractive index N1 of the higher refractive index section 402 and a refractive index N2 of the lower refractive index section 404 is set within a predetermined range in order to obtain the optical characteristics of the transmission screen 400. Furthermore, the angle between the oblique side where the lower refractive index section 404 and the higher refractive index section 402 come in contact with each other, and a normal to the outgoing light surface (which is parallel to the vertical incident light for the light diffusing sheet) is made a predetermined angle q.

The lower refractive index section 404 is colored to a predetermined density by pigments such as carbon, or by a predetermined dyestuff. Furthermore, the light diffusing substrate 401 and the base sheet 403 are constituted by materials having approximately the same refractive index as that of the higher refractive index section 402.

Next is a brief description of an optical path of incident light into the unit lens 402, with reference to FIG. 19A. In FIG. 19A and FIG. 19B, optical paths of light L1 to L4 are schematically shown.

A vertical light L1 which is incident from the image light source side to near the center of the unit lens 402, passes straight through the interior of the transmission screen 400 and to reach a viewer. A vertical light L2 which is incident from the image light source side to near the edge of the unit lens 402, is totally reflected at the oblique side due to the refractive index difference between the higher refractive index section 402 and the lower refractive index section 404, and passes out to the viewer side with a predetermined angle. A light L3 which is incident at an angle from the image light source side to near the edge of the unit lens 402, is totally reflected at the oblique side and passes out to the viewer side with a larger angle in the opposite direction to when incident. A stray light L4 which is incident on the oblique side with a larger angle than a predetermined angle, is not reflected in spite of the refractive index difference between the higher refractive index section 402 and the lower refractive index section 404, and is incident into the interior of the lower refractive index section 404. Since the lower refractive index section 404 is colored, the stray light is absorbed in the lower refractive index section 404 and does not reach to the viewer side. In this manner, a screen which has a wide viewing angle in the horizontal direction and which is high in contrast and brightness can be obtained.

Furthermore, in FIG. 19A, the light diffusing substrate 401 of the present invention is characterized in that; it mainly includes an organic material, a light diffusing layer contains two or more kinds of light diffusing material which differ in at least one of shape, mean particle diameter, and material, and at least one of the light diffusing materials includes an inorganic material.

Furthermore, FIG. 19B has approximately the same configuration as in FIG. 19A. However, a light diffusing substrate 501 of the present invention is characterized in that; it mainly comprises an organic material, a light diffusing layer contains two or more kinds of light diffusing material which differ in at least one of shape, mean particle diameter, and material, and at least one of the light diffusing materials includes an inorganic material.

According to these configurations, it becomes possible to enhance even more the effect where due to the above configuration of the lower refractive index section 404 and the higher refractive index section 402, a wider viewing angle in the horizontal direction is obtained and contrast and brightness are high.

What is claimed is:

1. A transmission screen comprising:
   a Fresnel lens sheet through which light is projected from a projector as approximately parallel light;
   a lenticular lens sheet which receives the approximately parallel light passing through the Fresnel lens sheet, and which horizontally widens and emits the approximately parallel light using a group of cylindrical lenses; and
   a light diffusing substrate having a light diffusing layer, which is provided with the lenticular lens sheet, wherein
   the light diffusing substrate is mainly composed of an organic material,
   the light diffusing layer contains at least two kinds of light diffusing material which differ at least in any one of shape, mean particle diameter, or material, and
   at least one kind of light diffusing material of the light diffusing materials comprises an inorganic material.

2. A transmission screen according to claim 1, wherein in the case where the shapes of at least two kinds of light diffusing material contained in the light diffusing layer are globular, the light diffusing layer contains a first light diffusing material with a mean particle diameter satisfying a range of 1 to 10 μm and a second light diffusing material with a mean particle diameter satisfying a range of 20 to 50 μm.

3. A transmission screen according to claim 1, wherein in the case where at least one kind of light diffusing material contained in the light diffusing layer comprises an organic material, the mean particle diameter of the organic light diffusing material is larger than the mean particle diameter of an inorganic diffusing agent where the light diffusing material comprises an inorganic material.

4. A transmission screen according to claim 1, wherein the at least two kinds of light diffusing material which differ at least in any one of shape, mean particle diameter, or material, contained in the light diffusing layer, further contain an inorganic light diffusing material of irregular shape.

5. A display device of a type which forms a display light by projecting an illumination light onto image display elements in which a display image is regulated by transmission/non transmission (or, transmission/light diffusion) or selective reflection,
   equipped with a transmission screen according to claim 1, in combination with another lens sheet.

* * * * *